United States Patent
Lippinois et al.

(10) Patent No.: US 9,126,679 B2
(45) Date of Patent: Sep. 8, 2015

(54) AIRPLANE INCLUDING MEANS FOR TAKING AT LEAST A PORTION OF THE BOUNDARY LAYER OF THE FLOW OF AIR OVER A SURFACE

(71) Applicant: SNECMA, Paris (FR)

(72) Inventors: Eric Pierre Maurice Lippinois, Moissy Cramayel Cedex (FR); Edouard De Jaeghere, Moissy Cramayel Cedex (FR); Philippe Minot, Moissy Cramayel Cedex (FR); Jerome Talbotec, Moissy Cramayel Cedex (FR)

(73) Assignee: SNECMA, Paris (FR)

( * ) Notice: Subject to any disclaimer, the term of this patent is extended or adjusted under 35 U.S.C. 154(b) by 226 days.

(21) Appl. No.: 13/679,381

(22) Filed: Nov. 16, 2012

(65) Prior Publication Data
US 2014/0283921 A1 Sep. 25, 2014

(30) Foreign Application Priority Data

Nov. 18, 2011 (FR) ..................................... 11 60530

(51) Int. Cl.
*B64C 21/00* (2006.01)
*B64C 21/02* (2006.01)
*B64D 33/02* (2006.01)

(52) U.S. Cl.
CPC .............. *B64C 21/025* (2013.01); *B64D 33/02* (2013.01); *B64D 2033/0226* (2013.01); *B64D 2033/0273* (2013.01); *Y10T 137/0536* (2015.04)

(58) Field of Classification Search
CPC ........... B64D 33/02; B64D 2033/0226; B64D 2033/0273
USPC .......................................... 244/53 B, 53 R, 54
See application file for complete search history.

(56) References Cited

U.S. PATENT DOCUMENTS

| 3,583,661 | A | 6/1971 | Stake |
| 5,490,644 | A | 2/1996 | Koncsek et al. |
| 7,861,968 | B2 * | 1/2011 | Parikh et al. ................ 244/118.5 |
| 2008/0164378 | A1 * | 7/2008 | Owens et al. ................ 244/53 B |
| 2010/0051756 | A1 * | 3/2010 | Leland et al. ................ 244/53 B |

FOREIGN PATENT DOCUMENTS

| WO | WO 2008/017567 A1 | 2/2008 |
| WO | WO 2010/049610 A1 | 5/2010 |

OTHER PUBLICATIONS

French Preliminary Search Report issued Jul. 13, 2012, in French 1160530, filed Nov. 18, 2011.

\* cited by examiner

*Primary Examiner* — Rob Swiatek
*Assistant Examiner* — Magdalena Topolski
(74) *Attorney, Agent, or Firm* — Oblon, McClelland, Maier & Neustadt, L.L.P.

(57) ABSTRACT

An airplane having at least one turbojet and means for taking at least a portion of the boundary layer of the flow of air over a surface of the airplane and for guiding the air that has been taken to an air inlet of the turbojet, the airplane being characterized in that the means for guiding air include means for diffusing the air that has been taken circumferentially in uniform manner over 360° at the air inlet of the turbojet.

8 Claims, 4 Drawing Sheets

AIRPLANE INCLUDING MEANS FOR TAKING AT LEAST A PORTION OF THE BOUNDARY LAYER OF THE FLOW OF AIR OVER A SURFACE

BACKGROUND OF THE INVENTION

The present invention relates to an airplane such as a civil or military airplane having turbojet engines, e.g. bypass engines, carried on a surface of the airplane such as the airplane fuselage or wing.

Present civil airplanes are propelled using turbojets that are fastened either under the wings by means of pylons, or on the fuselage, or indeed at the root of the tail fin, i.e. at the junction between the tail fin and the fuselage.

In the context of reducing fuel consumption, engine manufacturers are seeking to embed engines at least partially within a surface of the airplane so as to enable pylons to be eliminated together with their fairings, thus reducing the weight of the propulsion assembly and also the drag of the airplane. Furthermore, partially integrating engines in an airplane surface makes it possible to increase the diameter of the engines, thus making it possible to envisage using engines having a very large bypass ratio.

In flight, an air boundary layer forms on the surfaces of the airplane that are in contact with the surrounding air, thereby generating aerodynamic drag. The air boundary layer is due to air friction against the surfaces of the airplane. It has long been considered that engines ought not to ingest this boundary layer since that can impart large amounts of distortion to the fan and lead to vibration of the propulsion assembly, and airplanes have sometimes been fitted with boundary layer "traps" located upstream from the air inlets for engines that are partially embedded. That type of solution enhances the operability of turbojets and also their efficiency, but it is harmful to the propulsive efficiency of the assembly constituted by the airplane and its turbojets, thus increasing fuel consumption. The operability of a turbojet is defined as being its ability to operate in safe and reliable manner under a variety of operating conditions that include extreme conditions (e.g. ingesting a bird, compressor pumping, flow direction which consists in the air stream reversing in the compressor, . . . ).

Recent studies have shown that absorbing a portion of the boundary layer in engines serves to reduce the aerodynamic drag of the airplane and to reduce the speed of the air entering its engines, thereby increasing the efficiency of the engines.

In its patent application WO 2010/049610A1, the Applicant has proposed an airplane in which the turbojet nacelles are partially embedded in the fuselage. The air inlet of each engine is connected to the fuselage by walls for guiding the boundary layer, which walls extend upstream from the air inlet and splay apart from each other going upstream.

With such a configuration, a portion of the air from the boundary layer is guided to the air inlet of the engine, thereby enabling the aerodynamic drag of the airplane to be reduced and enabling the efficiency of the engine to be increased by lowering the speed of the air at the inlet of the turbojet.

Nevertheless, such ingestion of the boundary layer by the turbojet suffers from drawbacks in terms of turbojet operability. Ingesting boundary layer air at the inlet to a turbojet gives rise to major circumferential variation in the total pressure and in the speed of the air, since both the speed and the total pressure are smaller within the boundary layer.

BRIEF SUMMARY OF THE INVENTION

The incident direction of the air on a fan blade is determined in the frame of reference of the blade and depends on the ratio between the speed of rotation of the blade and the speed of the incoming air stream. In operation, it is found that the air entering into the turbojet strikes the leading edge zones of the blades situated in the boundary layer at an angle that is greater than the angle at the leading edges of the blades situated outside the boundary layer because of the smaller inward speed of the air coming from the boundary layer.

This variation in the angle of incidence on the blades as a function of their angular position can lead to separation of the air stream. Such separation consists in turbulence appearing on the suction side surface of the blade.

It is difficult to provide a solution to that problem since the angular pitch, i.e. the angle formed between the axis passing via the leading and trailing edges of a blade and the axis of the turbojet is constant, and it is difficult or even impossible to find an intermediate pitch angle that is suitable for a blade that alternates between receiving air at low speed from the boundary layer and air at greater speed, without having a significant impact on the efficiency of the turbojet.

That type of difficulty can lead to a significant decrease in the efficiency of the turbojet, and to a risk of pumping damaging the stationary vanes and the moving blades of the compressor, leading to a loss of thrust and to a danger of the turbojet stopping. In addition, the blades of the fan may be subjected to forced aero-elastic vibration. This type of vibration consists in dynamic bending or twisting and is due to the periodic variation in the forces that are applied to the blades, which is itself the consequence of the circumferential variation in the angle of incidence of the air stream on the blades. This vibration becomes particularly large when its frequency coincides with a resonant mode of vibration in the blade.

The above-mentioned difficulties may also have an impact on the operability of the row of stationary vanes located immediately downstream from the row of fan blades, which vanes are commonly referred to as outlet guide vanes (OGVs) and are located in the secondary air stream where they serve to straighten out the flow direction of the air stream coming from the fan. In order to obtain an optimum flow of the air stream around the OGVs, it is necessary to adapt their three-dimensional profile as a function of their angular position, thereby complicating the design and the fabrication of the OGVs, and possibly having a negative impact on the performance of the turbine engine. Furthermore, it is very likely that any modification to the shape of the OGVs would increase sound nuisance.

The circumferential distortions of pressure and speed due to ingesting the boundary layer also have an impact on the primary air stream ingested by the low-pressure compressor, thereby requiring modifications to the design of the low- and high-pressure compressors, of the combustion chamber, and of the high and low-pressure turbines through which the primary air stream flows.

In certain turbojet configurations having a nacelle partially embedded in an airplane surface, proposals have been made to mount turbulence-generating walls (sometimes also known as vortex generators) extending perpendicularly to the airplane surface upstream from the turbojet air inlet. Those walls are inclined relative to the axis of the turbojet so as to distribute the boundary limit air over a greater angular range at the inlet of the turbojet. Nevertheless, with that configuration, circumferential distortions of pressure and speed at the inlet to the turbojet are nevertheless not eliminated.

A particular object of the invention is to provide a simple, inexpensive, and effective solution to the above-mentioned problems, making it possible to avoid the drawbacks of the prior art.

To this end, the invention provides an airplane having at least one turbojet and means for taking at least a portion of the boundary layer of the flow of air over a surface of the airplane and for guiding the air that has been taken to an air inlet of the turbojet, the airplane being characterized in that the means for taking and guiding air comprise at least one channel having an upstream end that opens out into the boundary layer of the air flow over the airplane surface and an intermediate portion that forms means for performing circumferential diffusion and that presents a section that varies progressively on going downstream into a section that is substantially circular and that is connected continuously to the air inlet of the turbojet so as to diffuse the air taken from the boundary layer circumferentially in uniform manner over 360° at the inlet of the turbojet.

According to the invention, the boundary limit air is distributed and diffused at the inlet of the turbojet in uniform manner over 360°, such that the pressure and the speed of the air at the inlet of the turbojet are substantially uniform around the entire periphery of the inlet of the turbojet.

With a bypass turbojet, the fan blades arranged at the upstream end of the turbojet are all impacted by air having the same speed. It is then possible when designing the turbine engine to shape the fan blades and to set their angular pitch relative to the axis of the turbojet in a manner that is well adapted to ingesting an air stream at a reduced overall speed.

Making the air pressure circumferentially uniform at the inlet of the turbojet also serves to limit the bending or twisting vibration of the blades.

The invention thus makes it possible to improve the performance of the turbojet by ingesting a portion of the boundary limit air without reducing the operability of the turbojet.

In the invention, the air inlet of the turbojet is fed solely with air taken from the boundary layer. Some of the electrical and electronic equipment usually carried by the nacelle can thus be offset upstream from the turbojet and can be mounted on the outer surface of the means for taking and guiding air from the boundary layer. In this way, it is possible to further reduce the surface area of the nacelle that comes into contact with the surrounding air, and thus reduce aerodynamic drag even more.

According to another characteristic of the invention, the area of the section at the upstream end of the channel taking air from the boundary layer is greater than or equal to the area of the section of the air inlet of the turbojet so as to avoid feeding insufficient air to the turbojet.

Advantageously, the intermediate portion of the channel has stationary guide vanes that are spaced apart from one another in a direction that is substantially perpendicular to the airplane surface. These vanes enable the air of the boundary layer to be properly diffused at the inlet of the turbojet.

The vanes may advantageously be positioned in such a manner that the spacing between two adjacent vanes increases on going downstream. The air that is taken can thus be diffused and reinjected circumferentially in optimum manner over the entire diameter of the air inlet.

In a particularly advantageous configuration of the invention, the turbojet has a nacelle that is embedded at least in part in the above-mentioned airplane surface. Integrating the engine inside an airplane surface, such as the airplane fuselage, for example, serves to reduce the surface area of the nacelle that is in contact with the air flowing around the airplane, thus enabling its aerodynamic drag to be reduced. This configuration also makes it possible to eliminate the pylon connecting the turbojet to the airplane, thus reducing the weight of the assembly constituted by the airplane and the turbojet and further reducing the aerodynamic drag of that assembly.

According to yet another characteristic of the invention, the upstream end of the channel is spaced outwards from the surface of the airplane by a predetermined distance so as to avoid taking air from the portion of the boundary layer that is situated closest to the airplane surface for reinjection into the turbojet.

This offset of the channel inlet avoids excessively reducing the operability of the turbojet by avoiding ingesting air from the boundary layer that is closest to the airplane surface, where the air speed is very low or even zero. With this offset of the inlet to the air-taking channel, it is possible to achieve a compromise between turbojet operability and improving its performance as a result of ingesting air from the boundary layer.

The above-mentioned airplane surface may be formed by a portion of the airplane fuselage or by a portion of the airplane wing. With a wing portion, the turbojets may be mounted in the wings of the airplane.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
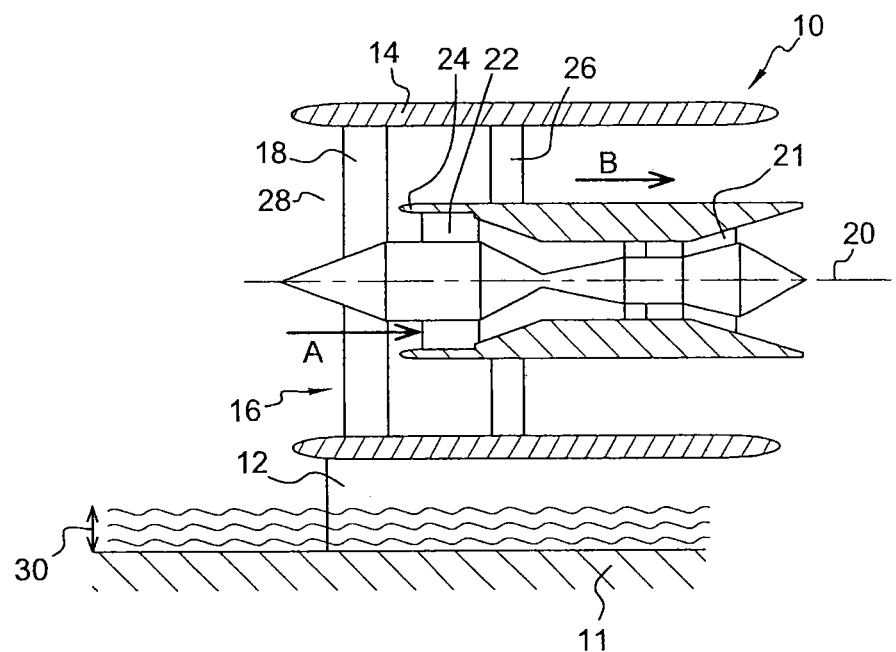
FIG. 1 is a fragmentary diagrammatic view in axial section of the upstream end of a bypass turbojet connected to a surface of an airplane by a pylon in accordance with the prior art.

Reference is made initially to FIG. 1 which shows a bypass turbojet 10 of known type connected to a surface 11 of an airplane by means of a pylon 12.

The turbojet 10 comprises a nacelle 14 surrounding a fan 16 arranged at the upstream end of the turbojet. The fan 16 comprises an annular row of radial blades 18 regularly distributed around the axis 20 of the turbojet and driven in rotation by the rotor of a low-pressure turbine 21 arranged downstream in a manner that is well known to the person skilled in the art.

A low-pressure compressor 22 is arranged downstream from the fan and includes an annular edge 24 for separating primary and secondary air streams, which edge is situated downstream from the radially inner portions of the fan blades 18. The low-pressure compressor is surrounded externally by an annular row of stationary outlet guide vanes 26 for guiding the air stream that bypasses the engine core, which vanes are connected externally to the nacelle 14 of the turbine engine 10.

The turbojet 10 has an annular air inlet 28 at its upstream end. The air that passes through the air inlet 28 of the turbojet 10 flows over the range of moving blades 18 of the fan and is split into a primary air stream (arrow A) that enters the low-pressure compressor 22, and a secondary or "bypass" stream of air (arrow B) that flows around the primary stream.

As shown in FIG. 1, the pylon 12 connecting the turbojet 10 to a surface 11 of the airplane avoids the turbojet 10 ingesting air from the boundary layer 30. This type of configuration enhances good operability of the turbojet. Nevertheless, the boundary layer 30 produces aerodynamic drag on the airplane, thereby reducing the overall performance of the airplane. This reduces the propulsive efficiency of the assembly constituted by the airplane and the turbojet 10, and increases fuel consumption.

Figure 2:
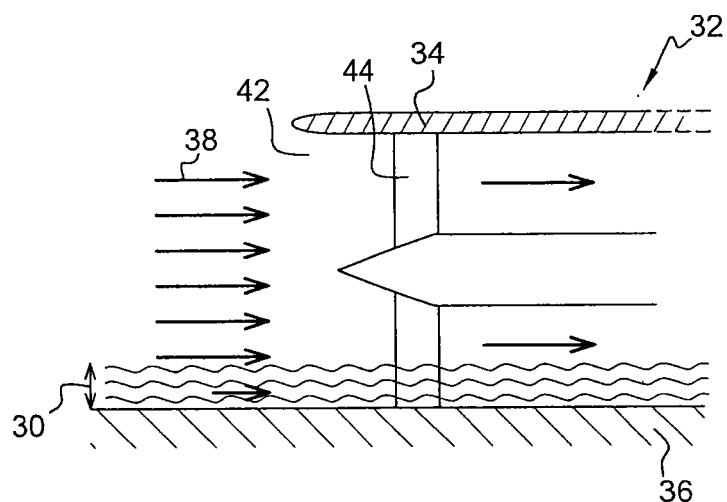
FIG. 2 is a fragmentary diagrammatic view in axial section of the upstream end of a bypass turbojet including a nacelle that is partially embedded in a surface of the airplane in accordance with the prior art.

FIG. 2 shows a turbojet 32 having its nacelle 34 partially embedded in a surface of the airplane 36. This type of mounting for a turbojet 32 in a configuration sometimes referred to as a "buried" engine serves to eliminate the pylon 12 shown in FIG. 1.

Such a configuration serves to improve the propulsive efficiency of the assembly constituted by the airplane and the turbojet 32 by reducing the air speed at the inlet to the turbojet by ingesting a portion of the boundary layer 30. This efficiency is further improved by reducing aerodynamic drag as a result of reducing the surface area of the nacelles 34 that is in contact with the air 38 flowing around the airplane.

Nevertheless, ingesting the boundary layer 30 causes the pressure and the speed of the air at the air inlet 42 of the turbojet 32 to be circumferentially very non-uniform. The low speed of the air entering the turbojet in the boundary limit ingestion zone leads to a major risk of separation in the air stream passing over the blades 44 situated in this zone because of the great difference between the speed of rotation of the blades 44 and the low speed of the air coming from the boundary layer 30.

As mentioned above, the blades 44 may be subjected to vibration in bending or in twisting due to pressure variations resulting from ingesting a portion of the boundary layer 30 at the inlet 42 of the turbojet 32.

In order to avoid the above-mentioned drawbacks of the prior art, the invention proposes means for taking and guiding the boundary layer to the air inlet of the turbojet that enable the portion of the boundary layer that has been taken to be diffused and reinjected to the inlet of the turbojet in a manner that is circumferentially uniform over 360°.

Figure 3:
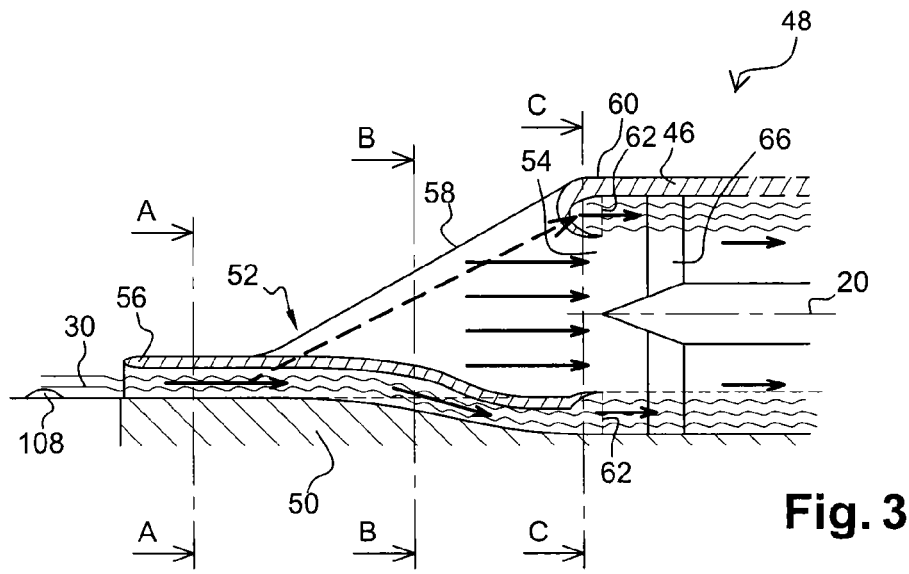
FIG. 3 is a fragmentary diagrammatic view in axial section of a bypass turbojet connected to an airplane in accordance with a first embodiment of the invention.
Figure 4:
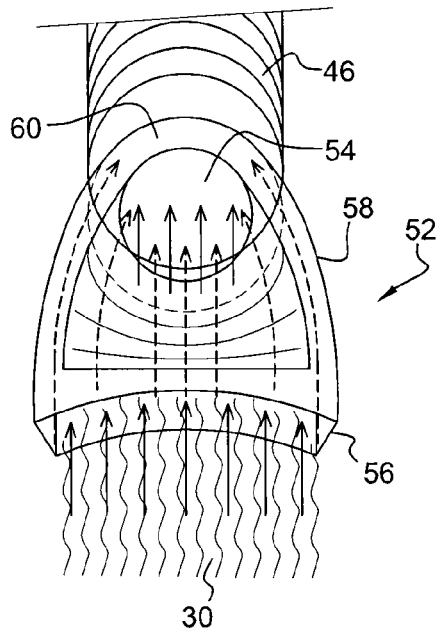
FIG. 4 is a diagrammatic view seen from upstream of the means for taking, guiding, and circumferentially distributing in uniform manner a portion of the air from the boundary layer.

In the embodiment of the invention shown in FIGS. 3 and 4, the nacelle 46 of the turbojet 48 is partially embedded in a surface 50 of the airplane.

The airplane has means for guiding and taking a portion of the air from the boundary layer. These means comprise a channel 52 extending upstream from the air inlet 54 of the turbojet along the surface 50 of the airplane. The channel 52 has an upstream end 56 that opens into the boundary layer 30 formed on the surface of the airplane 50.

The inlet 56 of the channel 52 for taking and guiding air extends transversely relative to the turbojet axis 20 over a portion of the surface of the airplane, and is of a length that is much greater than its height. The height of this inlet 56 is dimensioned to be substantially equal to the thickness of the boundary layer under most flying conditions of the airplane so that the air taken by the channel 52 (FIGS. 3 and 4) is taken solely from the boundary layer 30.

In general, the inlet 56 of the channel 52 is of a shape that matches the surface of the airplane on which it is mounted. The inlet 56 of the channel 52 may thus have a convex curved section, as shown in FIG. 4. It may also have a curved section that is concave, rectangular, or semi-elliptical.

Figure 5A:
FIGS. 5A, 5B, and 5C are diagrammatic views on section planes A-A, B-B, and C-C of FIG. 3.
Figure 5B:
Figure 5C:

The channel 52 has an intermediate portion 58 in which the air flow section varies progressively from upstream to downstream to become an annular section at the downstream end of the channel 52. FIGS. 5A, 5B, and 5C are diagrammatic cross-sections of the channel respectively at the air inlet of the channel 52 (line A-A in FIG. 3), at a middle portion of the intermediate portion 58 (line B-B in FIG. 3), and at the downstream end 60 of the channel 52 (line C-C in FIG. 3). The downstream end 60 of the channel 52 opens out into the nacelle and surrounds the air inlet 54 of the turbojet. In this way, the channel 52 enables the portion taken from the boundary layer to be diffused to the air inlet 54 of the turbojet in a manner that is circumferentially uniform over 360°.

The downstream end of the channel 52 has an annular radial wall 62 with openings of calibrated dimensions, e.g. holes or slots, serving to pass air coming from the boundary layer 30.

Figure 6:
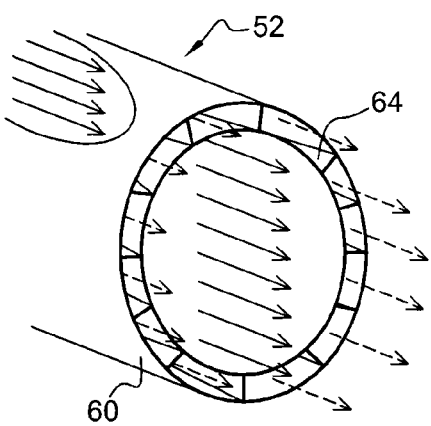
FIG. 6 is a diagrammatic view of an embodiment of the downstream end of means for diffusing the boundary layer circumferentially over 360°.

In a variant embodiment shown in FIG. 6, the downstream end of the channel 52 has a plurality of vanes 64 that are regularly spaced apart around the axis of the turbojet. In operation, these vanes 64 serve to guide the air coming from the boundary layer and entering into the turbine engine.

In operation, a portion of the boundary layer 30 penetrates into the channel 52 and is distributed circumferentially over 360° as it advances towards the air inlet 54 of the turbojet. This air is then reinjected circumferentially in substantially uniform manner over 360°, thereby eliminating any risk of separation in the air stream flowing over the fan blades. Since pressure is substantially uniform in a circumferential direction, vibration of the fan blades 66 is also limited.

Figure 7:
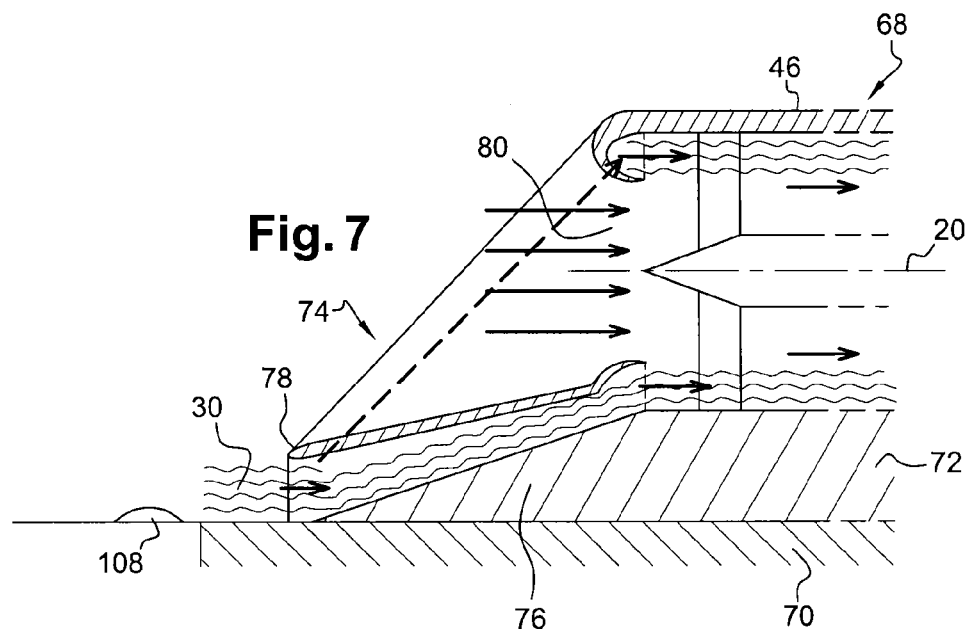
FIGS. 7 and 8 are fragmentary diagrammatic views in axial section of a bypass turbojet connected to an airplane in accordance with a variant of the invention.

As shown in FIG. 7, the turbojet 68 may be connected to the surface 70 of the airplane via a pylon 72 as in the prior art. The channel 74 for guiding the taken fraction of the boundary layer and for circumferentially diffusing it over 360° is substantially identical to the channel described with reference to FIGS. 3 to 5. In this type of configuration, the channel 74 is carried by a portion 76 presenting an axial section that is substantially triangular. This portion serves to provide the connection between the upstream end 78 of the channel 74 arranged in the boundary layer 30 and the air inlet 78 of the turbojet 68.

Figure 8:
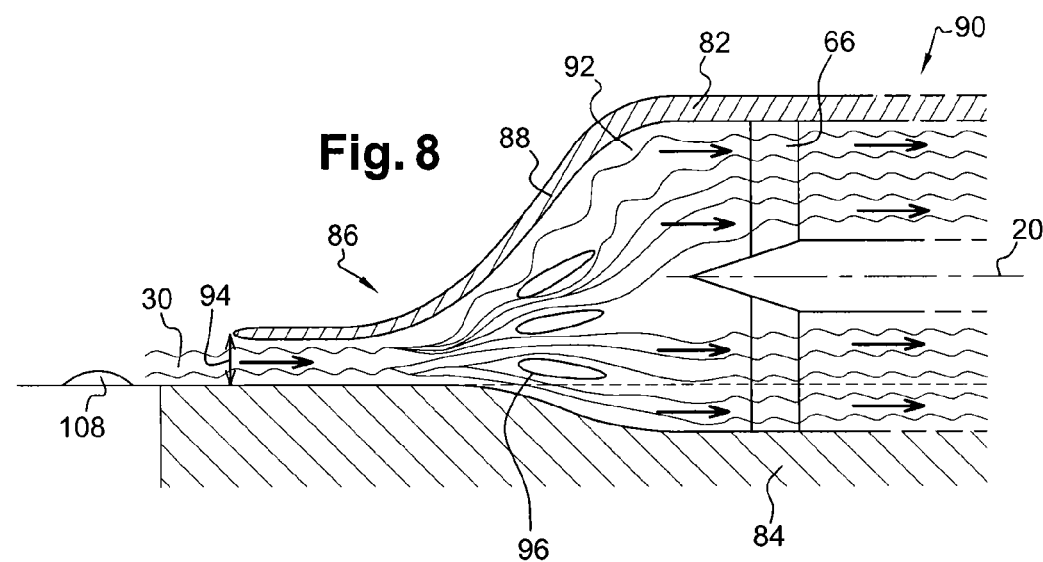

In another embodiment of the invention shown in FIG. 8, in which the nacelle 82 is partially embedded in the fuselage 84, the channel 86 has an intermediate portion 88 of section that varies progressively on going downstream towards a section that is circular. The downstream end of this intermediate portion 88 is connected in circumferentially continuous manner to the upstream annular end of the nacelle 82 of the turbojet 90.

With such a configuration, the air inlet 92 of the turbojet is fed entirely with the portion taken from the boundary layer 30. Under such circumstances, the area of the section 94 at the upstream end of the channel 86 for taking air is designed to be greater than or equal to the area of the air inlet section 92 of the turbojet, so as to avoid feeding the turbojet 90 with insufficient air.

The intermediate portion 88 may have stationary guide vanes 96 spaced apart from one another in a direction that is substantially perpendicular to the surface of the airplane that is connected to the turbojet. The spacing between two adjacent vanes 96 increases on going downstream so as to enable the air taken from the boundary layer 30 to be properly diffused at the inlet to the turbojet 92.

This embodiment of the invention makes it possible to offset some of the electrical and electronic equipment that is usually carried by the nacelle and to mount it immediately upstream from the turbojet on the outer surface of the channel 86 for taking and guiding air. This makes it possible to reduce the outside diameter of the nacelle 82 and thus reduce its aerodynamic drag.

As shown in FIG. 8, the channel 86, together with its intermediate portion 88, and the nacelle 82 form a wall that is continuous from upstream to downstream and that can be fitted with acoustic coverings both on its inner surface and on its outer surface so as to reduce the sound nuisance generated by the rotation of the fan blades 66.

Figure 9:
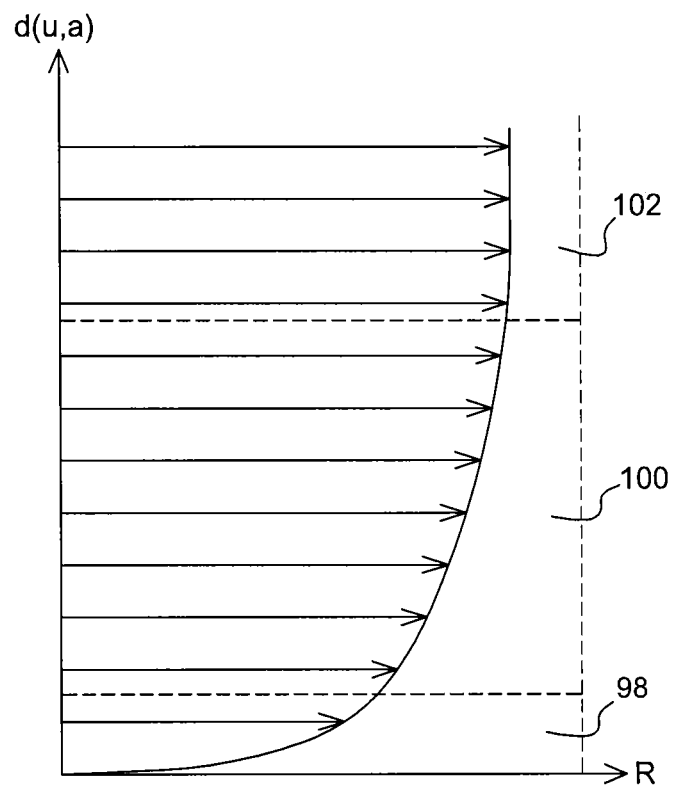
FIG. 9 is a graph with distance from the surface of the airplane plotted up the ordinate and with variation in the ratio R of the air speed in the boundary layer divided by the air speed outside the boundary layer plotted along the abscissa.

FIG. 9 is a graph showing in conventional manner distance from the fuselage of the airplane plotted up the ordinate (in arbitrary units: u, a), and variation in the ratio R of the air speed in the boundary layer 30 divided by the air speed outside the boundary layer along the abscissa. In this graph, it can be seen that the boundary layer comprises three zones: a first zone 98 in contact with the fuselage, referred to as the viscous sublayer or as the laminar flow zone; an intermediate second zone 100; and an outer third zone 102.

Figure 10:
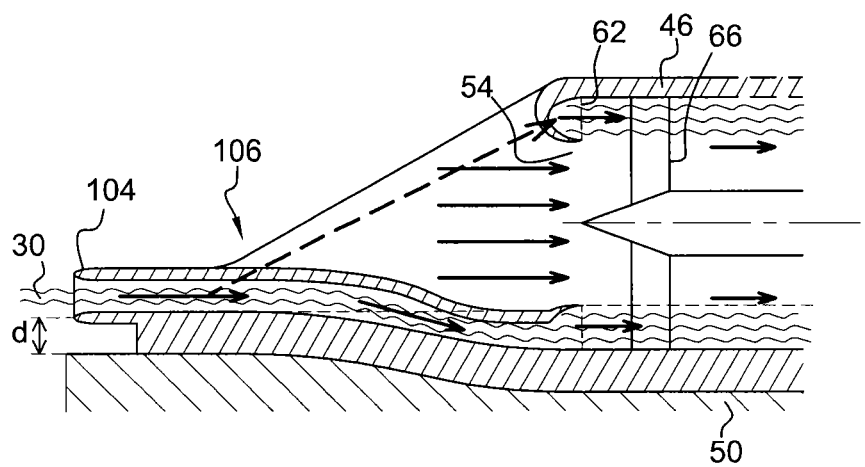
FIG. 10 shows a variant positioning relative to the fuselage of the airplane for the means for taking and guiding air.

FIG. 10 shows mounting similar to that of FIG. 3 with the exception that the upstream end 104 of the channel 106 for taking and guiding air is spaced apart from the surface 50 of the airplane by a distance d. This arrangement is particularly advantageous when there remains distortion in the pressure and the speed of the air at the inlet of the turbojet in spite of the presence of means for diffusing the air taken from the boundary layer circumferentially in uniform manner over 360°. The distance d is determined so as to avoid taking air coming from the first zone 98 and/or all or part of the air coming from the intermediate zone 100 (FIG. 9). This serves to eliminate residual pressure and speed distortions at the air inlet of the turbojet, thus making it possible to obtain a good compromise between the operability of the turbojet and the improvement in the performance of the turbojet by ingesting a portion of the boundary layer.

It is possible to form a projection 108 upstream from the inlet to the channel for taking air, as shown in FIGS. 3, 7, and 8. This projection 108 prevents foreign bodies from entering into the channel for taking and guiding air, by deflecting such bodies outwards.

In the description above, the term "airplane surface" designates the portion of the airplane fuselage or of its wing that is connected to the turbojet.

In certain embodiments where air is taken from the fuselage of the airplane, the inlet of the channel 52, 74, 86, or 106 for taking and guiding air from the boundary layer may extend circumferentially over part or all of the circumference of the airplane fuselage.

When air is taken over a portion of the airplane wing, the turbojet may be partially embedded in the top of the airplane wing in order to make it possible to use engines having a large bypass ratio.

The invention claimed is:

1. An airplane, comprising:
a turbojet; and
means for taking at least a portion of a boundary layer of a flow of air over a surface of the airplane and for guiding the air that has been taken to an air inlet of the turbojet, wherein the means for taking and guiding air comprise a channel having an upstream end that opens out into the boundary layer of the air flow over the airplane surface and an intermediate portion that forms means for performing circumferential diffusion, the intermediate portion having a transverse cross-section that varies progressively going downstream into a section that is substantially circular and that is connected continuously at the downstream end over 360° to an upstream end of the air inlet of the turbojet so as to diffuse the air taken from the boundary layer circumferentially in uniform manner over 360° at the inlet of the turbojet.

2. The airplane according to claim 1, wherein an area of the section at the upstream end of the channel taking air from the boundary layer is greater than or equal to an area of the section of the air inlet of the turbojet.

3. The airplane according to claim 1, wherein the intermediate portion of the channel has stationary guide vanes that are spaced apart from one another in a direction that is substantially perpendicular to the airplane surface.

4. The airplane according to claim 3, wherein the spacing between two adjacent vanes increases on going downstream.

5. The airplane according to claim 1, wherein the upstream end of the channel for taking air is outwardly spaced from the airplane surface by a predetermined distance to avoid taking air from the slowest-speed portion of the boundary layer.

6. The airplane according to claim 1, wherein it includes a nacelle that is at least partially embedded in the above-mentioned airplane surface.

7. The airplane according to claim 1, wherein the airplane surface connected to the turbojet is formed by a portion of an airplane fuselage or wing.

8. The airplane according to claim 1, wherein the air inlet of the turbojet is fed entirely by the air that has been taken from the at least a portion of the boundary layer.

\* \* \* \* \*